United States Patent [19]

Greenwell

[11] 4,404,512

[45] Sep. 13, 1983

[54] MOTOR DRIVE CIRCUIT

[75] Inventor: Jack Greenwell, Reno, Nev.

[73] Assignee: LearAvia, Reno, Nev.

[21] Appl. No.: 363,291

[22] Filed: Mar. 29, 1982

Related U.S. Application Data

[63] Continuation of Ser. No. 114,081, Jan. 21, 1980, abandoned.

[51] Int. Cl.³ .............................................. H02P 5/40
[52] U.S. Cl. ..................................... 318/807; 318/803
[58] Field of Search ........ 318/506, 801, 803, 807–811; 307/252 M; 363/37, 57, 58, 138

[56] References Cited

U.S. PATENT DOCUMENTS

| | | | |
|---|---|---|---|
| 3,344,326 | 9/1967 | Risberg | 318/798 |
| 3,365,640 | 1/1968 | Gurwicz | 307/252 M |
| 3,403,318 | 9/1968 | Krauthamer et al. | 363/37 |
| 3,660,738 | 5/1972 | Anderson et al. | 318/506 |
| 3,710,230 | 1/1973 | Venard | 307/252 M |
| 3,753,677 | 8/1973 | Anderson et al. | 318/506 |
| 3,780,324 | 12/1973 | Greenwell | 318/773 |
| 3,781,641 | 12/1973 | Rettig | 318/807 |
| 3,938,015 | 2/1976 | Beebe | 318/139 |
| 3,980,941 | 9/1976 | Griebel | 363/138 |
| 4,054,818 | 10/1977 | Risberg | 318/807 |

*Primary Examiner*—David Smith, Jr.
*Attorney, Agent, or Firm*—Jackson, Jones & Price

[57] ABSTRACT

An inverter circuit for use in connection with loads such as motors and transformers is disclosed. The inverter includes separate precharge circuitry for precharging the commutating capacitor, clamping diodes for clamping the voltage on the inverter power elements to the precharge voltage level, and steering diodes for coupling the motor or transformer to the SCRs. The steering diodes allow the commutating capacitors to be charged to a precharge voltage level which is selected to be at least twice the maximum voltage to be applied to the load. The clamping diodes, by limiting the maximum voltage on the inverter power components, allows the use of components of substantially reduced voltage ratings. The precharge circuit provides reliable commutation at low motor speeds and voltage levels. Other embodiments and improvements are disclosed.

16 Claims, 5 Drawing Figures

FIG. 3
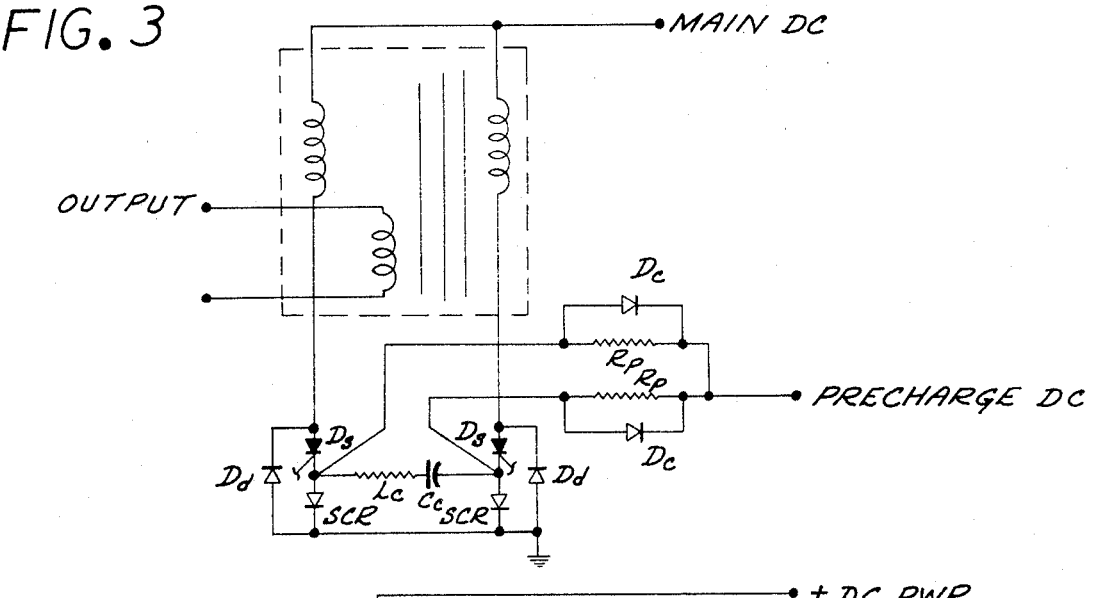
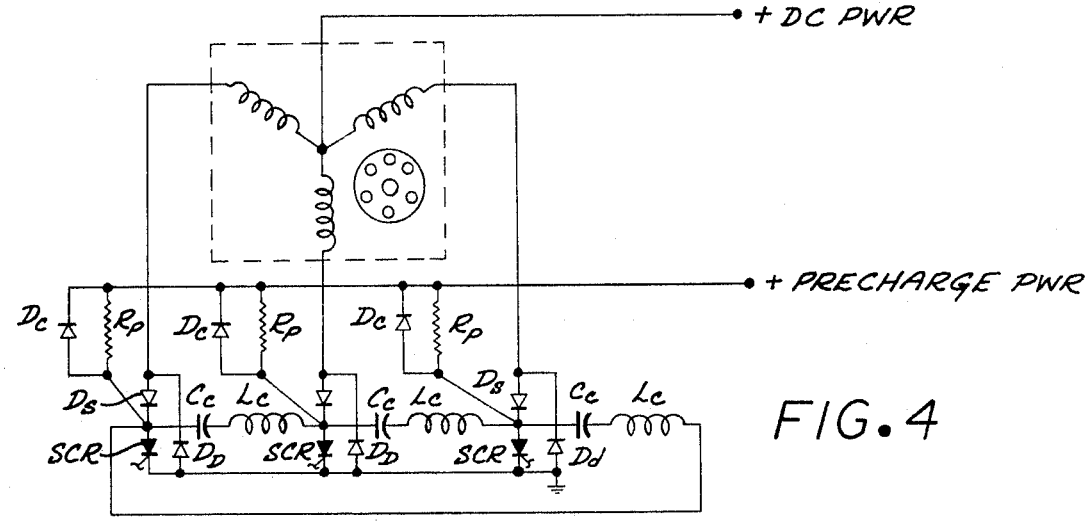
FIG. 4
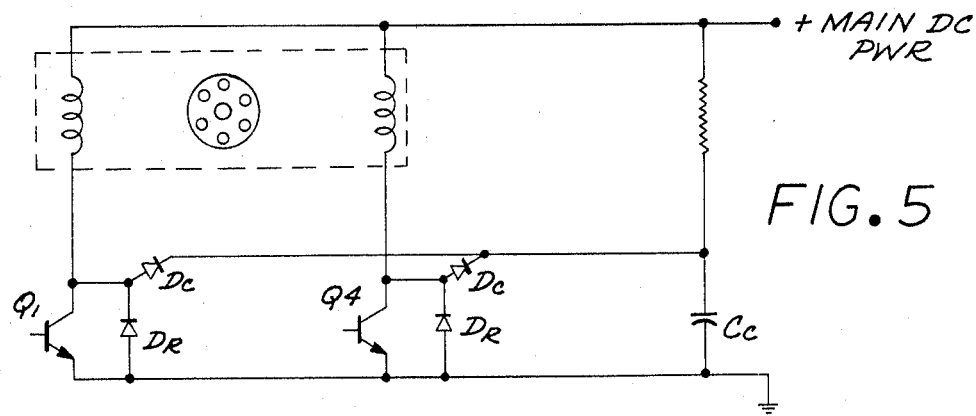
FIG. 5

MOTOR DRIVE CIRCUIT

This is a continuation of application Ser. No. 114,081, filed Jan. 21, 1980, now abandoned.

BACKGROUND OF THE INVENTION

1. Field of the Invention

The field of this invention is switching circuitry for electrical power applications, and more particularly to inverter circuits for driving electric motors, transformers and the like.

2. Description of the Prior Art

The invented circuit is intended for applications such as a drive system for motors such as shown in U.S. Pat. No. 3,780,324. The inverter shown in that patent, as shown in FIG. 1 therein, utilizes SCR(30) switching, commutating capacitors 29 and inductances 28, and reactance diodes 31. Such inverter circuits are also shown and described in the Standard Handbook for Electrical Engineers, Fink and Carroll, Tenth Edition, at section 12-37. One disadvantage to such circuits is that inverter circuit components with high voltage ratings were required, since these components were subject to the high voltage transients induced by the sudden current switching. Another disadvantage of such prior art inverter circuits is that they are subject to miscommutation, particularly at low motor speeds when the motor voltage is relatively low as is the energy available for commutation.

One technique which has been used to minimize miscommutation is to utilize a separate voltage source to precharge the commutating capacitors, thereby avoiding variation of available commutating energy with varying DC voltage. However, the voltage transients are still present, requiring components with high voltage ratings. R-C snubber circuits are typically used to bypass spurious harmonic frequencies and stabilize the SCR control circuitry. However, these resonant circuits tend to raise the voltage on the semiconductor components even more by "ringing up" the voltage.

SUMMARY OF THE INVENTION

An inverter circuit for driving loads such as motors and transformers is disclosed. The preferred circuit embodiment utilizes SCR current switching elements to control the current flow through the separate stator windings of the motor. These power SCRs are each coupled to their respective motor stator windings through steering diodes. The anodes of the complementary SCRs, i.e. the SCR coupled to complimentary windings, are coupled together by a commutating capacitor and inductor, as is well known. A separate DC voltage precharge supply is provided and is coupled to the anodes to the SCR's by a precharge resistor. A clamping diode is provided in parallel connection with the precharge resistor for clamping the voltage at the SCR anodes to the precharge bus voltage, which is selected to be at least twice the maximum motor stator winding voltage. Reactive diodes are connected from the anodes of each steering diode to the cathode of each SCR for carrying reactive energy during commutation.

In operation, commutation from one motor phase to its complementary phase is achieved by timed gating of the SCRs, i.e. removing the gate signal to the SCR of one phase and providing a gate signal to the SCR of the complementary phase. Due to the blocking action of the steering diode, the commutating capacitor is charged to the voltage of the precharge supply, and, upon SCR switching, will discharge through the SCR just gated "on". The commutation is achieved by a constant, selected voltage independent of the motor voltage or frequency to provide reliable commutation at any speed or voltage. The clamping diodes clamp the maximum voltage on the inverter components to the precharge supply voltage, and also transfer excess energy to the precharge bus.

Other embodiments and improvements are shown.

BRIEF DESCRIPTION OF THE DRAWINGS

Other advantages of the invention will become more fully apparent from the following description provided in conjunction with the drawings which show preferred embodiments of the invention, and in which like reference numerals designate like parts throughout the figures thereof, and wherein:

FIG. 3 is a schematic diagram of an alternate embodiment of the present invention for use in connection with a transformer.

FIG. 4 is a schematic diagram of a second alternate embodiment of the present invention.

FIG. 5 is a schematic diagram showing a third alternate embodiment of the present invention for use in conjunction with a transistor inverter.

DETAILED DESCRIPTION OF THE INVENTION

The present invention comprises an inverter circuit which may be utilized with current switches such as SCRs or transistors and used to drive loads such as polyphase motors, transformers or the like. While the invention is described with reference to certain preferred and alternate circuit embodiments, other uses and embodiments will be apparent to those skilled in the art.

Figure 1:
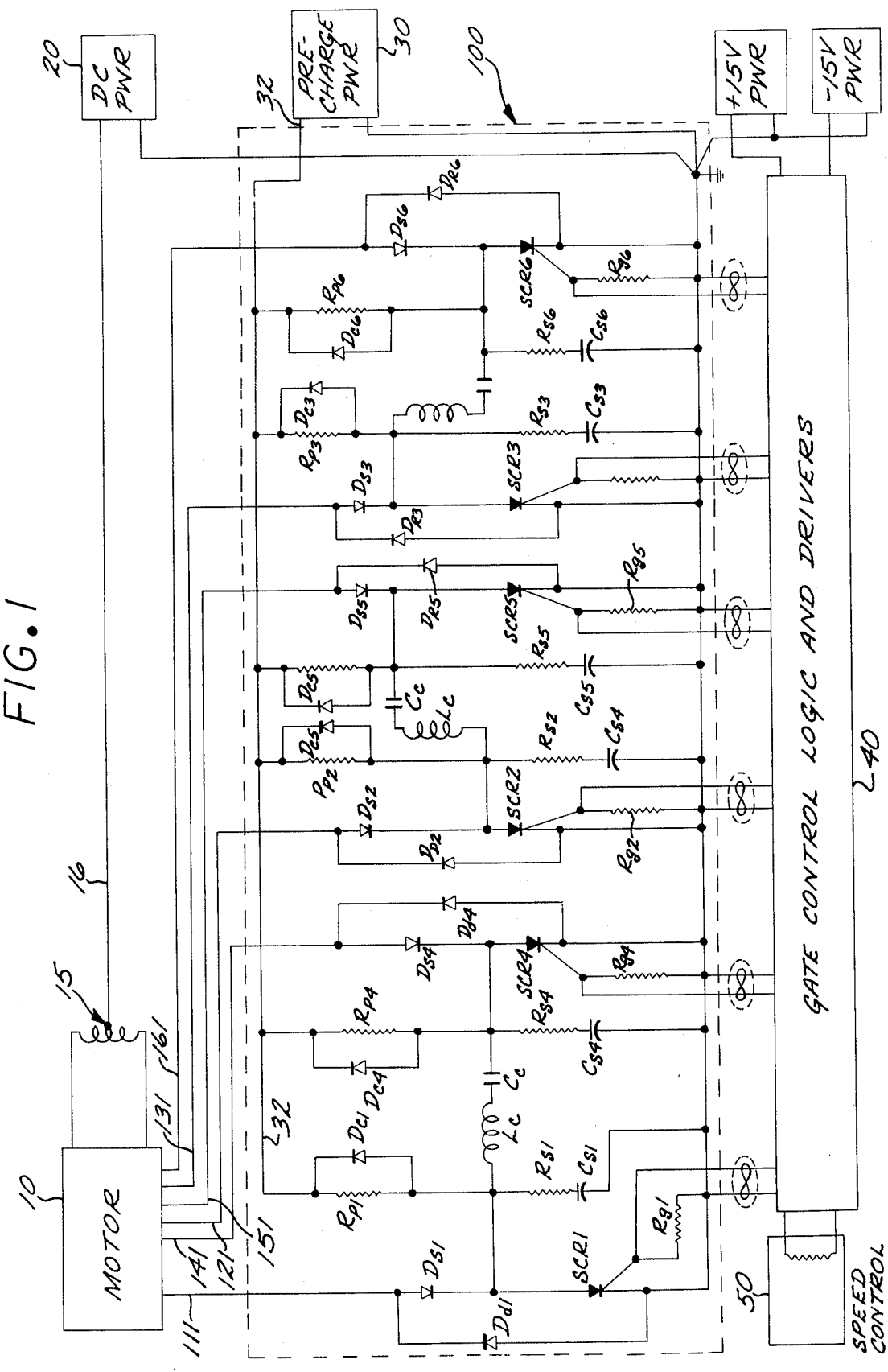
FIG. 1 is a schematic and block diagram of a motor system in accordance with the present invention.
Figure 2:
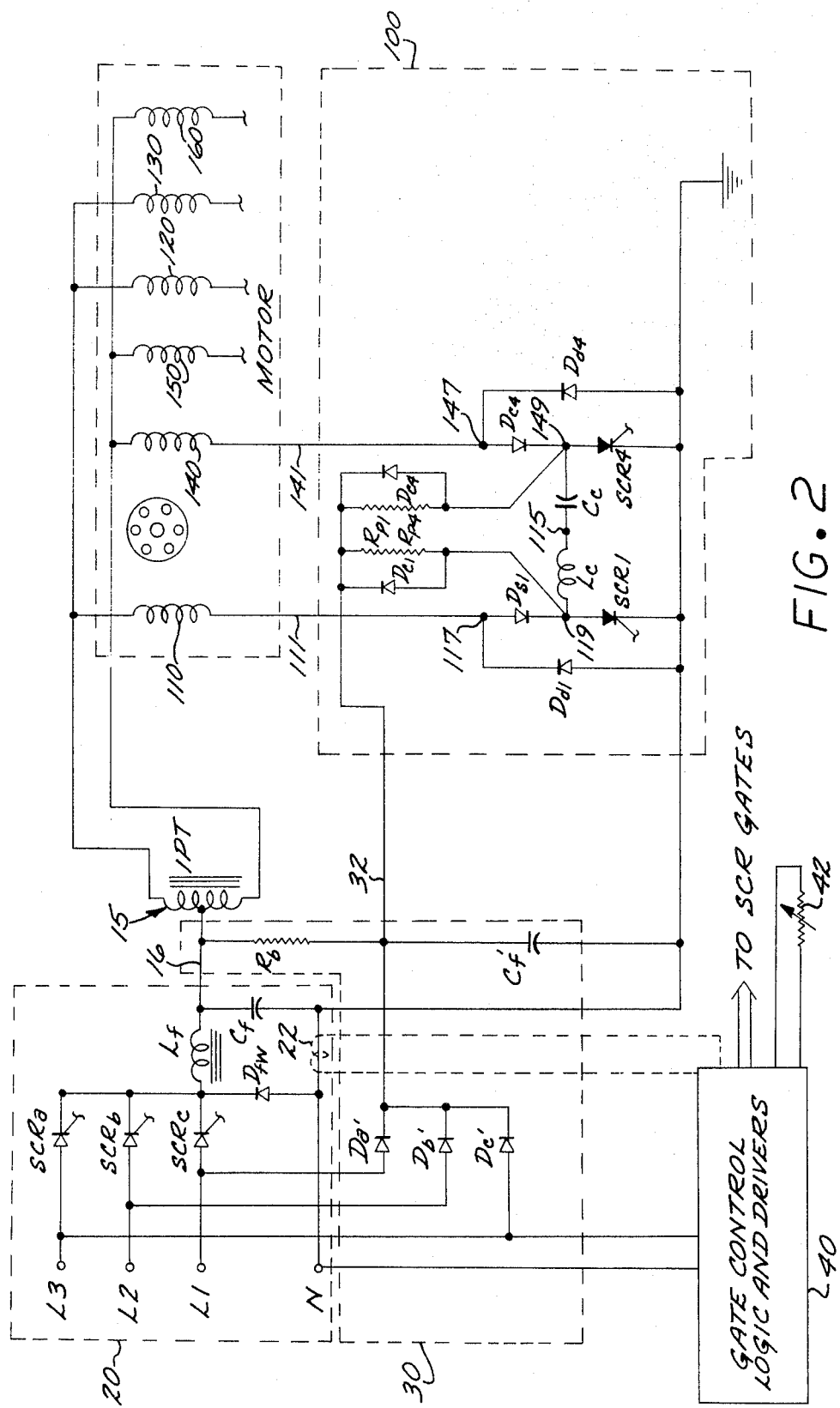
FIG. 2 is a schematic circuit diagram illustrative of the present invention, showing the subcircuits for motor winding 1 and 4, and omitting for clarity the subcircuits for windings 2, 3, 5 and 6.

The present invention relates specifically to the commutating aspects of the inverter, as opposed to the motor phase control logic circuitry. The preferred embodiment disclosed in FIGS. 1 and 2 is intended to be used in conjunction with motor systems such as are described in U.S. Pat. No. 3,780,324 issued on Dec. 18, 1973 and also invented by the applicant hereto. The preferred embodiment will be discussed with respect to the motor drive system and disclosure of that patent, and the relevant aspects of that patent disclosure will not be repeated herein, as the complete specification of U.S. Pat. No. 3,780,324 is incorporated herein by this reference.

Referring now to FIGS. 1 and 2, the preferred embodiment of the subject invention will now be described. FIG. 1 discloses the specific inverter circuitry coupled to the various component of the motor system such as is disclosed in U.S. Pat. No. 3,780,324. The inverter logic circuitry is shown only in schematic block form. Typical logic circuitry is described and disclosed in the above referenced patent; other logic circuits are known in the prior art and may be used in connection with circuit embodiments of the present invention. The motor 10 in the disclosed embodiment is a three phase motor with six half-phase stator windings. The motor 10 is coupled to the source of DC power 20 via the interphase transformer 15, which serves to reduce third harmonic effects.

The inverter circuit 100 (shown enclosed within the phantom line of FIG. 1) operates the polyphase motor 10. Also disclosed in FIG. 1 are SCR gate drivers and control logic 40 and speed control 50. The inverter circuitry includes an SCR current switch for each stator winding for selectively coupling the respective windings of the motor to ground in accordance with the gate signals supplied by the gate driver. There are six motor stator windings in the motor of the disclosed embodiment of FIG. 1, which are respectively coupled to the inverter circuitry by leads 111, 141, 121, 151, 131 and 161, respectively. It will be appreciated by those skilled in the art that the motor stator windings comprise three sets of two half-phase complementary windings. Hence, windings 1 and 4 represent a winding pair, with windings 2 and 5 and windings 3 and 6, respectively, comprising the other two winding pairs. For simplicity and ease of description, only the elements of the inverter circuit relating to the first winding pair as labeled in FIG. 1 are represented in FIG. 2.

Reference to FIG. 1 discloses that the inverter circuit comprises six similar subcircuits, each subcircuit coupled to its respective stator winding and to the corresponding subcircuit for the complementary stator winding. For example, the anode of SCR 1 is coupled to motor winding 1 via lead 111 and steering diode $D_{sl}$. The cathode of SCR 1 is connected to ground. The gate of SCR 1 is coupled to gate driver 40 via gate resistor $R_{gl}$. Snubber resistor $R_{sl}$ and snubber capacitor $C_{sl}$ are connected in series from the anode of SCR 1 to ground. Reactive diode $D_{dl}$ is connected cathode to anode from the anode of steering diode $D_{sl}$ to the cathode of SCR 1. The anode of SCR 1 is coupled to the precharge power source 30 via precharge resistor $R_{pl}$. Clamping diode $D_{cl}$ is connected cathode to anode across the precharged resistor $R_{pl}$ from the precharge bus 32 to the anode of SCR 1. The subcircuitry for the motor winding 4, as well as for the other windings, is similarly configured.

The subcircuits for the motor winding 1 and motor winding 4 are coupled together by the commutating capacitor $C_c$ and commutating inductor $L_c$.

FIG. 2 is a schematic representation of the motor drive system, along with the main DC power source and precharge power source. Lines L1, L2, L3 and N represent a four-wire, three phase AC power input to the motor system. $SCR_a$, $SCR_b$ and $SCR_c$ comprise the phase control current switching elements for the DC power source. $L_f$ comprises the main DC filter choke, $C_f$ the main DC filter capacitor, and $D_{fw}$ a free wheeling diode. (Free-wheeling diodes and their operation are discussed in the standard Handbook for Electrical Engineers, Tenth Edition, edited by D. Fink and J. Carroll and the reference discussed therein). Element 22 comprises an inductive current sensor for use in controlling the torque of the motor.

In the embodiment of FIG. 2, the precharge supply is derived from the main AC power input to the motor system. $D_a'$, $D_b'$, and $D_c'$ comprise the precharge power supply rectifiers. $R_b$ and $C_f'$ comprise a precharge bleeder resistor and precharge DC filter capacitor, respectively. Thus, by selection of the value for $R_b$, the DC level may be adjusted.

As will be explained hereinafter, for the preferred embodiment, the level of the DC precharge supply is selected to at least twice the maximum voltage of the motor power supply 20.

Referring now to the inverter circuitry 100, it may be seen that the subcircuits connected to windings 150, 120, 130 and 160 have been omitted for clarity, as well as the snubber RC series elements which would ordinarily be connected anode to cathode from each SCR, as shown in FIG. 1. Line 111 connects motor winding 110 to the inverter subcircuit at node 117. Similarly, motor winding 140 is connected via line 141 to the complementary inverter subcircuit at node 147. The precharge bus 32 couples the DC precharge power supply 30 to the inverter subcircuits.

To explain the operation of the circuit, a typical low-speed operating pitch may be assumed, for example, 10% of maximum speed. At this point, $SCR_a$, $SCR_b$ and $SCR_c$ would be gated "on" for only a few degrees conduction. For a 120/208 three-phase four wire input, the variable DC line voltage is assumed as 30 volts DC, and the precharge bus 32 at 170 volts DC. Gate timing is assumed when $SCR_1$ is turned on and $SCR_4$ is turned off (time 0T in FIG. 6A of U.S. Pat. No. 3,780,324). With $D_{sl}$ and $SCR_1$ conducting and of very low impedance, nodes 117 and 119 will therefore be at approximate ground potential. Node 115 will also be at ground potential.

$SCR_4$ is gated off, in the nonconducting mode. The transformer action of the motor will double the 30 volts DC applied by the DC supply to the motor windings and raise node 147 to approximately 60 volts. With $SCR_4$ turned off, the precharge bus back biases steering diode $D_{s4}$ and raises the voltage at node 149 from approximately 60 volts to approximately 170 volts via precharge resistor $R_{p4}$. Commutating compacitor $C_c$ will therefore be fully charged for commutation at time 3T, represented in FIG. 6A of U.S. Pat. No. 3,780,324.

At time 3T (of FIG. 6A in U.S. Pat. No. 3,780,324) the gate signal of $SCR_4$ is applied, and the gate signal of $SCR_1$ is removed. Commutating current from the discharge of $C_c$ circulates via $SCR_4$ through the reactive diode $D_{dl}$, through steering diode $D_{sl}$, through commutating inductor $L_c$ to commutating compacitor at node 115. This commutating current flow provides back bias to $SCR_1$ equal to the forward voltage drops of reactive diode $D_{dl}$ and steering diode $D_{sl}$. The back bias on $SCR_1$ allows it to regain its blocking capability. The time required for this commutation is determined by the time constant of the $L_c$ and $C_c$ circuit.

As the commutation is completed, the voltage at node 17 rises suddenly due to two separate factors. The capacitor $C_c$ presents a voltage square wave at 170 volts, and the sudden interruption of current through the motor winding 110 causes a voltage spike. The rate of rise of the voltage at node 117 is controlled by a snubber RC circuit (not shown in FIG. 2) while the maximum voltage at node 117 is clamped by clamping diode $D_{cl}$ to the precharge bus voltage.

Even though $SCR_4$ is gated on, no real current will instantaneously flow since there is reactive energy trapped in motor winding 110. This reactive energy is carried via $D_{d4}$ of phase 4 until phase 4 is ready to carry real power. Now real current will start to flow through $SRC_4$ and the magnetomotive force (MMF) in the motor is reversed.

After commutation, some of the energy stored in $C_c$ has been lost. This lost energy is made up by the precharge bus.

This brings operation to time 3T+ and the cycle is ready to repeat at time 6T.

Commutation of the other phases is identical but at intermediate times to extablish the required phase angles between phases.

The steering diodes allow the capacitor to be precharged to the relatively high value of the precharge bus. Without the steering diodes, the precharge bus would be applied to the motor winding 141 which has a relatively low impedance. Not only would operation of the motor be affected by the precharge voltage, but the commutating capacitor could not be precharged to the relatively high value of the precharge bus.

The precharge voltage level is preferably selected to be at least twice the maximum voltage to be supplied to the motor windings. With this precharge level, even when the motor operating at maximum voltage, the voltage at node 117 or 147 (twice the level of the main dc voltage applied to the motor via line 16 due to the transformer action of the motor) will not be greater than the precharge voltage applied to nodes 119 and 149.

The above circuit provides several important advantages. The communication elements are precharged to a known voltage independent of motor voltage or frequency thereby providing reliable commutation at any speed or voltage.

Much smaller commutating components are required for the circuit of the present invention than in prior art circuits, including that shown in U.S. Pat. No. 3,780,324. The size of the required capacitor $C_c$ can be determined by the following equation:

$$I_c = C_c dv/dt \qquad \text{(Eq. 1)}$$

where $I_c$ is the current to be commutated, $\overline{dv}$ is the voltage on the capacitor prior to commutation, $C_c$ is the commutating capacitor in microfarads, and dt is the SCR turn off time in microseconds. Accordingly, $C_c$ is computed by the following equation:

$$C_c = I_c dt/dv \qquad \text{(Eq. 2)}$$

Therefore, the lower the voltage on the capacitor, the higher the capacitance required to generate the commutating pulse current. At very low motor speeds, the motor voltage would be very low and without the precharge circuit of the present invention, the voltage on the capacitor $C_c$ would accordingly be very low, necessitating the use of a relatively large capacitance $C_c$ to furnish the same level of commutating current. With the use of the precharge circuit shown in the present application, the voltage on the capacitor prior to commutation is a known constant, preferably selected at approximately twice the highest motor voltage.

The peak forward voltage of the SCR's, and in fact all of the inverter power parts, are voltage clamped (or limited) to the voltage of the precharge bus. This allows power components with a lower voltage ratings to be utilized than would be possible with the precharged but not clamped inverter.

If resonant snubber components are utilized, the snubber circuit is simpler (only one capacitor and one resistor) as opposed to the normal snubber circuit comprised of two resistors, a diode and capacitor. although snubber circuitry tends to raise the voltage on the semiconductor by ringing up the voltage, with the clamp circuit this does not occur since the diodes clamp the voltage and transfer excess snubber energy to the precharged bus.

It will be apparent to those skilled in the art that the above invention may be utilized with loads other than a poly phase motor. For example, the circuit of FIG. 3 discloses use of the circuit in connection with a transformer, which may either be a single phase unit or part of a polyphase unit (in which case the inverter circuitry could be as shown in FIG. 1). (The circuit elements are labelled in FIGS. 3, 4 and 5 in a corresponding manner to the components of FIGS. 1 and 2, i.e., Dc for clamping diodes, Rp for precharge resistors, etc.)

Motors, transformers or other loads of any number of phases could be utilized with the present circuit. For example, FIG. 4 discloses a three SCR precharged parallel leg inverter in accordance with the present invention for driving a motor or transformer.

Circuits in accordance with the present invention can also be used in conjunction with transistors as current switches to form excellent transistor inverters. For example, FIG. 5 illustrates a voltage clamped parallel leg transistor inverter (only one of N phases is shown). In this embodiment, the comutating components, and precharge resistors and bus are not utilized. The transistors are also voltage clamped so that transients due to the transistor switching do not demand very high rated voltage transistors. The transistors are protected against possible line to line faults as could be encountered in a bridge inverter. A circuit such as this shown in FIG. 5 is best suited for relatively smaller inverter/motor systems.

While the voltage clamps disclosed in the described embodiments are diodes, other methods of limiting the voltage applied to the SCR's might also be used. Further, in certain applications the SCR voltage may be clamped at levels other than that of the precharge supply. While the precharge voltage supply 30 is derived from the main power input to the motor system, an independent voltage supply might also be used.

Accordingly, as demonstrated in the foregoing, the circuit disclosed in the present application may be used in conjunction with transformers, motors, or their loads, and such loads may be induction, synchronous or other suitably known AC machinery. Parallel operation may be used such that more than one motor operates off a single inverter. Another advantage is that by appropriate voltage and frequency selection, such systems may be operated as constant torque variable speed motors, variable torque, variable speed motors, constant horsepower variable speed motors, or fixed speed motors. Another use may be as a DC generator utilizing either squirrel cage or synchronous machinery thereby allowing a four quadrant operation such as may be required for any regenerative application such as an elevator or hoist.

Other advantages embodiments and features will be apparent to those skilled in the art.

What is claimed is:

1. A parallel-leg inverter circuit for variable frequency, variable voltage operation with a DC voltage supply and electrical loads having at least first and second windings comprising:

first and second current switch means arranged in parallel legs, said first switch means coupled to said first winding and said second switch means coupled to said second winding:

first and second reactance rectifier means coupled to said first and second windings, respectively;

commutating capacitor means coupled to said first and second switch means;

precharge voltage source coupled to said commutating means and adapted to provide a precharge bus voltage at least substantially twice the maximum DC voltage supply;

first and second clamping means, coupled respectively to said first and second current switch means for limiting the voltage applied across said current switch means to approximately the voltage level of said precharge means; and control means for selective operation of said current switch means.

2. The circuit of claim 1 further comprising R-C snubber means coupling the anode of each said clamping means to ground potential.

3. The circuit of claim 2 further comprising of first and second steering rectifier means respectively coupling said silicon controlled rectifier means to said first and second motor windings.

4. A parallel-leg inverter circuit for operation with loads having at least first and second windings comprising:

first and second current switch means, said first switch means coupled to said first winding and said second switch means coupled to said second winding;

a commutating capacitor means and a commutating inductor means coupled between the anodes of each of said first and second current switch means;

first and second steering rectifier means respectively coupling one of said current switch means to a respective one of first and second motor windings;

a voltage precharge means for supplying a precharge voltage to said commutating capacitor and inductor means, of a substantially constant value and substantially unvariable with variations in the main voltage supplied to the windings;

first and second reactance rectifier means coupled respectively to said first and second windings;

first and second clamping means, coupled respectively to said first and second current switch means, for limiting the voltage applied across said current switches; and control means for selective operation of said current means.

5. The circuit of claim 4 wherein said precharge means comprises a voltage precharge source coupled to each of said anodes of said current switch means.

6. The circuit of claim 5 wherein said clamping means is adapted to limit the voltage applied to said current switch means to substantially the level of said voltage precharge source.

7. The circuit of claim 6 wherein said clamping means comprises diode means coupled anode to cathode from the anode of the current switch means to the voltage precharge source.

8. The circuit of claim 4 wherein said precharge means includes means for deriving a substantially constant voltage from the circuit main power supply.

9. A parallel leg inverter for operation of induction machines or transformers having at least first and second windings, comprising:

first and second current switch means arranged in parallel legs and adapted for controlling current flow through said first and second windings, respectively;

commutator capacitor means and commutator inductor means coupled in series between the respective anodes of said current switch means;

first and second steering rectifier means coupling said first and second motor windings to said anodes of said first and second switching means;

voltage precharge means for providing a voltage at each of said anodes of said current switch means which is substantially unvarying with variations in the main DC voltage supplied to said windings;

voltage clamping means for limiting the voltage applied to said current switch means to substantially the level of the voltage precharge source;

first and second reactance rectifier means respectively coupled between the anode and cathode of said switching means; and control means for selective activation of said current switch means.

10. The circuit of claim 9 wherein said current switch means comprise silicon controlled rectifiers and said steering rectifier means, said clamping means and said reactance rectifier means comprise semiconductor diode means.

11. The circuit of claim 9 wherein the level of said precharge voltage is selected to be at least twice the maximum voltage to be applied to said load.

12. The circuit of claim 9 wherein said voltage precharge means is coupled to said current switch anodes by first and second precharge resistances respectively.

13. The circuit of claim 9 further comprising series R-C circuits coupled from the anodes of said switch means to ground.

14. In a parallel leg motor drive system comprising an induction motor having at least first and second windings, each winding being coupled to an SCR, the anodes of said SCR's being coupled together by a commutating capacitor and commutating inductor, said SCRs being controlled by gate driver and control logic for controllably gating said SCRs, and further comprising first and second diode means coupled cathode to anode across said SCRs, the improvement comprising:

voltage precharge means for providing a precharge voltage to said commutating capacitor, said precharge voltage being at least approximately twice the maximum main DC voltage supplied to said motor; and clamping means for limiting the voltage applied to said SCRs to substantially the level of said voltage precharge means.

15. The improvement of claim 14 further comprising first and second steering rectifier means coupling said motor windings to said SCRs.

16. The improvement of claim 15 wherein said voltage precharge means comprises voltage supply means coupled to each of the anodes of said SCRs.

* * * * *